(12) United States Patent
Dahlin et al.

(10) Patent No.: US 6,474,459 B1
(45) Date of Patent: Nov. 5, 2002

(54) OUTBOARD CLUTCH ASSEMBLY SUPPORT

(76) Inventors: John H. Dahlin, P.O. Box 61, LaGrangeville, NY (US) 12540; Stephen J. Grotzinger, 6 Baris La., Hopewell Junction, NY (US) 12533; Joseph H. Pistner, S. Saint Marys Rd., Saint Marys, PA (US) 15857

( * ) Notice: Subject to any disclaimer, the term of this patent is extended or adjusted under 35 U.S.C. 154(b) by 0 days.

(21) Appl. No.: 09/476,534

(22) Filed: Jan. 3, 2000

(51) Int. Cl.$^7$ .............................................. F16D 13/58
(52) U.S. Cl. .................. 192/110 B; 192/115
(58) Field of Search ................. 192/70.13, 70.27, 192/96, 110 B, 115; 384/445, 456, 490, 495

(56) References Cited

U.S. PATENT DOCUMENTS

| | | | |
|---|---|---|---|
| 1,662,601 A | | 3/1928 | Demchuk |
| 3,625,327 A | | 12/1971 | Birdsey |
| 4,611,701 A | | 9/1986 | Friedman |
| 4,727,970 A | | 3/1988 | Reik et al. |
| 4,732,251 A | * | 3/1988 | Tipton ..................... 192/70.24 |
| 5,005,686 A | | 4/1991 | Reik et al. |
| 5,033,598 A | * | 7/1991 | Tipton ..................... 192/70.24 |
| 5,322,148 A | * | 6/1994 | Fernandez ................ 192/70.13 |
| 5,740,773 A | * | 4/1998 | Ohshige ............... 123/198 DA |
| 6,102,183 A | * | 8/2000 | Gerken ..................... 192/91 A |

OTHER PUBLICATIONS

MT Engineering, Catalog #98–1 (Date unknown).
Rivera Engineering, Photo of Jim McLure at Newport News, VA (Date unknown).

* cited by examiner

*Primary Examiner*—Richard M. Lorence
(74) *Attorney, Agent, or Firm*—Stephen G. Matzuk

(57) ABSTRACT

A clutch assembly outboard support comprising at least one bearing mounted to an outer structure near the clutch assembly, e.g. the clutch housing or protective cover, and mounted to or impacting upon the clutch assembly itself, to relieve the force applied to the inner support bearing of the transmission input shaft and to restrict clutch assembly motion regardless of the engine, starter drive or other forces applied to it. The increased clutch stability and alignment according to the present invention provide more complete clutch disengagement allowing for significantly improved transmission shifting characteristics by reducing or eliminating clutch drag during shifting. Furthermore, the various embodiments according to the present invention substantially enhance the bearing life, increase the positional stability of the clutch assembly in its normal operation, enhance the useful life of the clutch components, reduce wear on the transmission and starter assemblies, provide increased starter efficiency, reduce drive-line backlash, and potentially enhance performance by increasing available power by reducing power lost in the clutch assembly and associated bearing and connecting elements, without disturbing traditional outboard clutch deployment.

18 Claims, 5 Drawing Sheets

OUTBOARD CLUTCH ASSEMBLY SUPPORT

FIELD OF THE INVENTION

The present invention relates to the support of clutch assemblies, in particular, to outwardly supporting motorcycle clutch assemblies.

BACKGROUND OF THE INVENTION

A typical clutch assembly incorporates a rotating clutch disk plate selectively secured against a facing plate. This facing plate is directly secured to the fly wheel. The clutch disk plate is connected via a spline to the mainshaft, which extends in opposite directions and thru both plates. One end of the mainshaft goes thru the clutch disk plate and into the transmission. The other end goes thru the facing plate, the flywheel and on into the crankshaft of the engine. There is a support bearing near each of the plates to support the mainshaft and accurately position the clutch disk plate. However, certain manufacturers of motorcycles have elected to place the clutch assemblies so that they are supported with only a single bearing on the inward side, providing only limited support to the entire clutch assembly and transmission input shaft or mainshaft.

Typically a motorcycle "wet" clutch assembly is composed of an adjusting plate, spring assembly, pressure plate, adjusting screw, disk assembly, inner hub, outer hub, pilot bearing, and transmission input shaft or mainshaft. The disk assembly consists of 6–8 fiber disks "stacked" in a parallel arrangement along a common axis between parallel metal plates. The disk assembly is connected to the inner hub via splines on the metal disks. The disk assembly is connected to the outer hub via extended legs on the fiber disks. The clutch is released or disengaged by the push rod exerting force on the pressure plate, which is permitted to move outwardly, by compressing the spring assembly. The spring assembly being fixed outwardly by the adjusting plate, which is secured via bolts to the inner hub. The amount of compression being determined by the positioning of this adjustment plate relative to the bosses on the inner hub. Different positionings being determined by shims or an adjustment capability built into the adjustment plate itself. Disengagement permits the inner hub to move freely of the outer hub and rotate freely on the pilot. bearing. The inner hub is directly connected to the end of the transmission input shaft via a keyway and nut. The mainshaft then proceeds inwardly thru the pilot bearing in the outer hub, then thru an inward support bearing and subsequently into the interior of the transmission output shaft and subsequently into the transmission. The outer hub is connected to the engine by a chain or belt which attaches to the drive sprocket on the outer hub. The disengagement of the rotation of the outer hub from the inner hub is what achieves the disengagement of the motor from the transmission. However, the entire clutch assembly is outwardly positioned from the inward support bearing, its only means of support.

The energy from the engine is typically supplied by a chain drive which pulls the entire. clutch assembly forward. This forward movement, of the entire clutch assembly, presses the transmission input shaft against one side of the inward support bearing, causing rapid wear. This forward movement of the clutch also causes misalignment of the clutch release elements and consequently the clutch is no longer able to be fully disengaged. Without proper disengagement of the clutch, shifting up or down cannot be done without grinding of gears, clanking, or other difficulties since the clutch is now binding or dragging when it should be completely disengaged. The forward movement of the clutch assembly also causes unnecessary transmission wear. The transmission input shaft passes thru the transmission output shaft and on into the transmission. Any misalignment or binding of these two shafts causes premature wearing of these shafts and reduces the overall power output of the motorcycle. As the transmission input shaft enters into the transmission, its misalignment will also affect any gears, bushings, and bearings which it impacts upon. All of these problems, caused by the forward movement of the clutch assembly, are exacerbated as wear occurs and accumulates on the inward support bearing.

A further problem is looseness in the linkage between the rear (drive) wheel and the engine, commonly called "backlash." A certain amount of backlash is necessary. However, it is desirable to minimize this looseness as much as possible. Fore and aft motion of the clutch relative to the engine and the rear wheel provide a significant component of motorcycle drive train backlash. An unstabilized clutch assembly significantly contributes to the drive train backlash.

An additional problem in certain motorcycle models is starter drive inefficiency. The motorcycle starter drive engages the ring gear of the outer hub of the clutch which also is connected via the drive sprocket to the engine via chain or belt drive. If the motorcycle is started while in neutral, the starter drive will force the clutch assembly away from the starter drive and cause a binding of the gears in the starter drive and ring gear. If the motorcycle is started while in gear, the engagement of the outer hub by the starter drive, again urges the clutch to move away from the starter drive, causing the clutch to partially engage, increasing the energy needed to start the motorcycle engine.

SUMMARY OF THE INVENTION

The present invention provides several embodiments of clutch assembly outboard supports comprising at least one bearing mounted to an outer structure near the clutch assembly, e.g. the clutch housing or protective cover, and mounted to or impacting upon the clutch assembly itself, to relieve the force applied upon the inward support bearing and to restrict clutch assembly motion regardless of the engine, starter drive or other forces applied to it. The embodiments according to the present invention substantially enhance the bearing life and increase the positional stability of the clutch assembly in its normal operation without disturbing traditional outboard clutch deployment. Furthermore, the increased clutch stability and alignment according to the present invention provide more complete clutch disengagement allowing for significantly improved transmission shifting characteristics by reducing or eliminating clutch drag during shifting. Furthermore, these embodiments according to the present invention reduce wear on the transmission and starter assemblies, provide increased starter efficiency, reduce drive line backlash, and potentially enhance performance by increasing available power.

BRIEF DESCRIPTION OF THE DRAWING

These and further features of the present invention will be better understood by reading the following Detailed Description together with the Drawing, wherein.

DETAILED DESCRIPTION OF THE INVENTION

Figure 1:
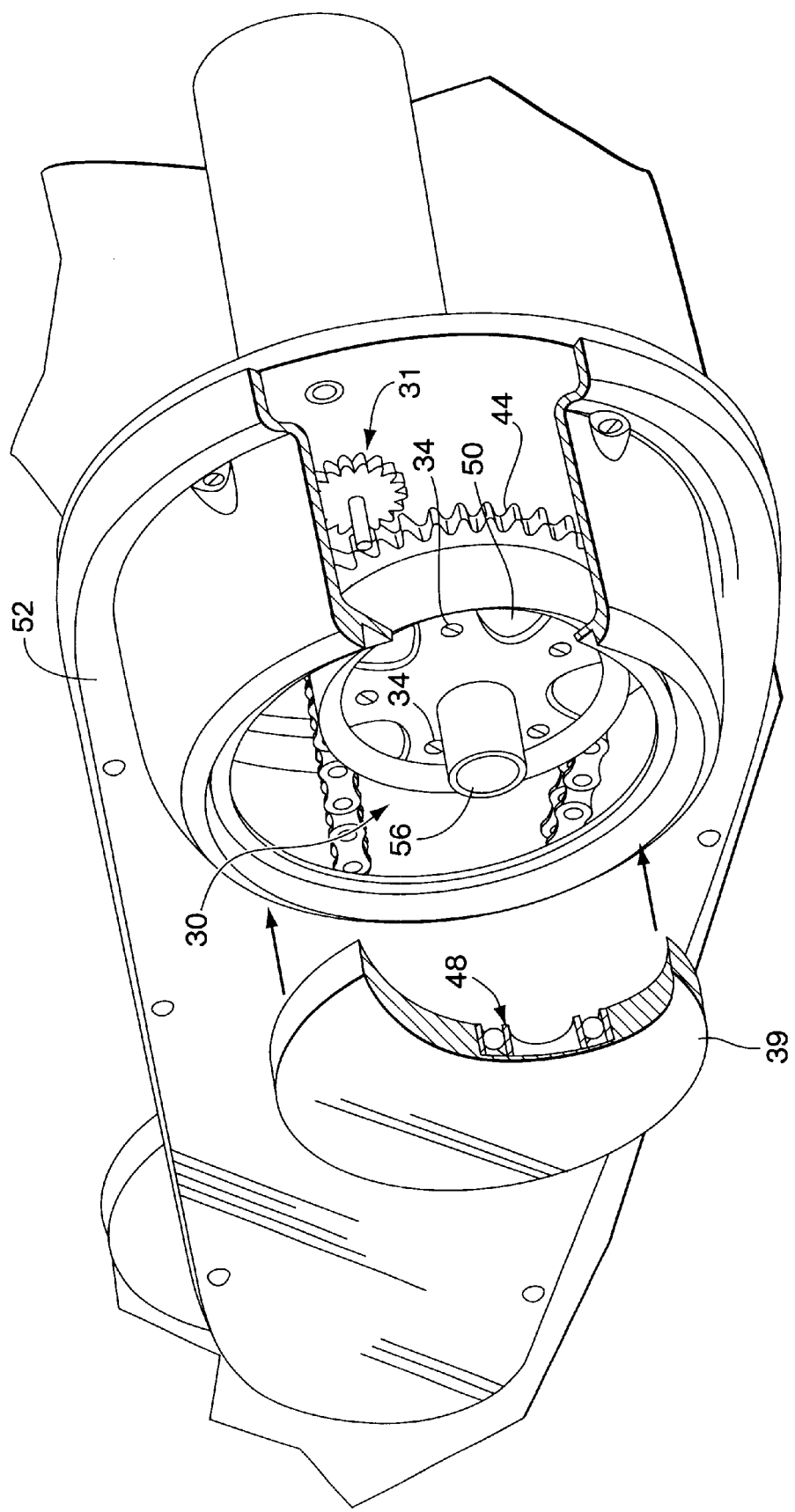
FIG. 1 is a perspective, exploded, partially cut-away view of one embodiment according to the present invention.

According to the present invention, the embodiment shown in FIG. 1 provides an adjusting plate 50 in the clutch assembly 30 that includes a shaft 56 extending axially outward from the clutch to engage a bearing 48 mounted in a chain cover 52 housing cover ("Derby" cover) plate 39. Except as provided by the present invention as exemplified by the various embodiments, the clutch assembly is largely the same as provided in stock motorcycle equipment, as described above. In particular, having a plurality of clutch plates and disks in an assembly having circumferential gear and sprocket teeth to receive driving force from the engine and to receive a starter drive 31 and having a transmission input shaft that extends into the transmission.

The shaft 56 of the adjusting plate 50 is received by a bearing 48 or bearing structure retained by or formed within a cover plate 39, which traditionally mounts to or in a chain cover 52. The outer diameter of the shaft 56 is provided to be in hand slip fit agreement with the inner diameter of the bearing 48 or bearing structure to facilitate ease of assembly and to prevent the bearing from seizing to the shaft. The inner diameter must be of sufficient dimension to accommodate penetration by a socket wrench (or equivalent) adjustment tool to adjust the clutch. The top face of the adjusting plate or mandrel is precisely shaped, achieving the proper clearances for the clutch and alignment for the bearing.

The second subassembly is a self-aligning bearing which accommodates minor deviations from the desired angular alignment with the inwardly located and concentric transmission input and output shafts by swiveling around the extension of the centerline of these inward shafts. The self-aligning bearing 48 is mounted by a retainer to the cover 39 by bolts, which may also allow for shaft 56 and bearing 48 alignment if the bolt holes are slightly oversized (as compared to the bolt shafts). Alternately, the bearing may be attached to a recess in the cover 39 by a press-fit.

The third subassembly is a cover 39, also called a "Derby" cover, which needs sufficient tensile strength to support the clutch assembly via the shaft 56 and bearing 48. A sufficient number of anchoring points must be utilized to attach the cover 39 to the chain cover 52 in a stable position relative to the clutch assembly 30. When pillow block bearings are utilized, there must also be sufficient tensile strength relative to the thickness of the cover 39 to provide anchoring of the bearing 48 without rupturing the cover 39. For press-fit bearing assemblies, the cover must be of sufficient thickness to allow for the countersunk mounting of the bearing, which will then be supported by the walls of the countersunk hole.

Figure 2:
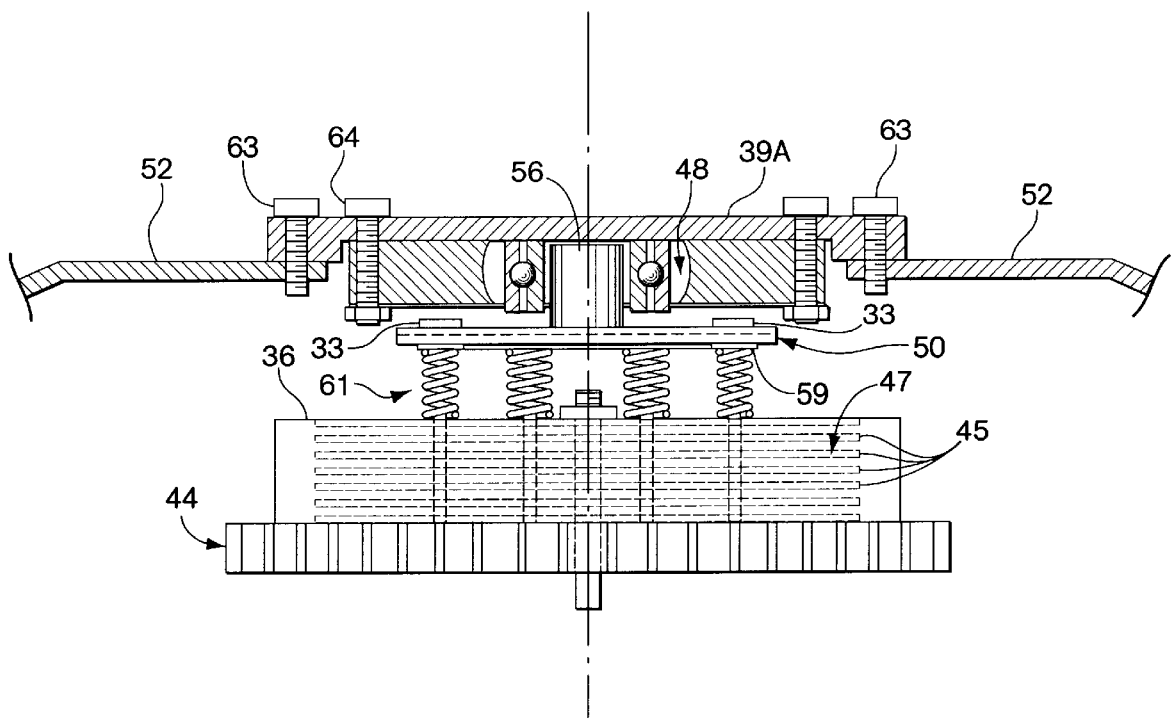
FIG. 2 is an elevation, partially cut-away view of one embodiment according to the present invention.

With respect to the clutch pressure plate 36, as depicted in FIG. 2, the proper calibration and adjustment of the mandrel 50 may be provided by the use of threaded (or equivalent) measurement spacing devices (e.g. threaded spacers) to provide a precise dimension between the bottom side of the mandrel 50 and the top side of the clutch pressure plate 36.

The dimension, or lengths selected for the spacers, is determined according to the clutch disks used, which may vary according to manufacturer. The dimension is determined so as to achieve a partial compression of the pressure plate springs, as the mandrel bottoms out on the spacers 59 when an appropriate nut 33 torque is applied. The nut 33 adjustment against the pressure plate springs 61 maintains the precise spacing between the inner edge of the adjustment plate or mandrel 50 and the top of the clutch pressure plate 36. This precise spacing may also be attained by using a 90° cutter to produce a square edge on the tapered portion of the clutch pressure plate adjustment rod lying below the termination of the clutch adjustment rod threads. Typically the clutch spring tension must be uniformly distributed among the pressure plate springs (typically 10 in number), which allows a continuously perpendicular release movement of the clutch pressure plate, and is achievable by using a uniform length on all ten pressure plate springs, while holding a tolerance of no more than 0.3%.

The clutch assembly 30 shows a ring gear 44 to engage a starter drive 31. The clutch assembly also typically includes a sprocket for engaging a chain drive from the engine, or a pulley for receiving a belt drive from the engine.

According to an inventive feature, the bearing 48 and shaft 56 Are selected to prevent or reduce the likelihood of the bearing 48 seizing to the shaft 56, or the catastrophic failure and injury to the rider as a result thereof. The shaft 56 is preferably a shaft of hardened steel, e.g. cold rolled steel, or other similarly hardened material. Should the bearing assembly fail due to a lack of lubrication, bearing defect or foreign matter therein, the bearing 48 and the shaft 56 will not immediately seize or fuse, but emit an audible screech or squeal to indicate the failing bearing, allowing the rider to safely stabilize and decelerate.

A further consideration in the operation and construction of the outboard clutch support bearing 48 according to the present invention is the possibility. for the bolts 34, which retain the mandrel 50, to become loose. According to the exemplary embodiments, the bolts 34 are countersunk into the mandrel 50 and secured (e.g. by Loctite (TM)). The bearing 48 and derby cover 39 are disposed to closely confront the surface of the mandrel and the bolts 34 therein, so that even if the bolts 34 become loose and unwind, there is limited travel for the bolts, which effectively prevents further exiting of the bolts, and provides the rider with an annoying rattle.to indicate loose parts.

In a "dry" clutch arrangement, nuts 34, as shown in FIG. 2, are screwed onto the clutch adjusting rods over. which the pressure plate springs 61 are disposed. The stock arrangement of the clutch pressure plate 36, the clutch disks 47, metal disk bearing 45, the ring gear 44, etc., are unaffected. The new cover plate 39A according to the present invention is secured to the chain cover 52 substantially as originally provided. According to the present embodiment, a pillow block bearing 48 is employed, wherein the placement of the bearing is generally determined by making minor adjustments fore, aft, up and down, before the cover and/or bearing bolts, 63, 64 are secured. Subsequent adjustments may also be provided at a future time to provide the alignment thereof.

Figure 3A:
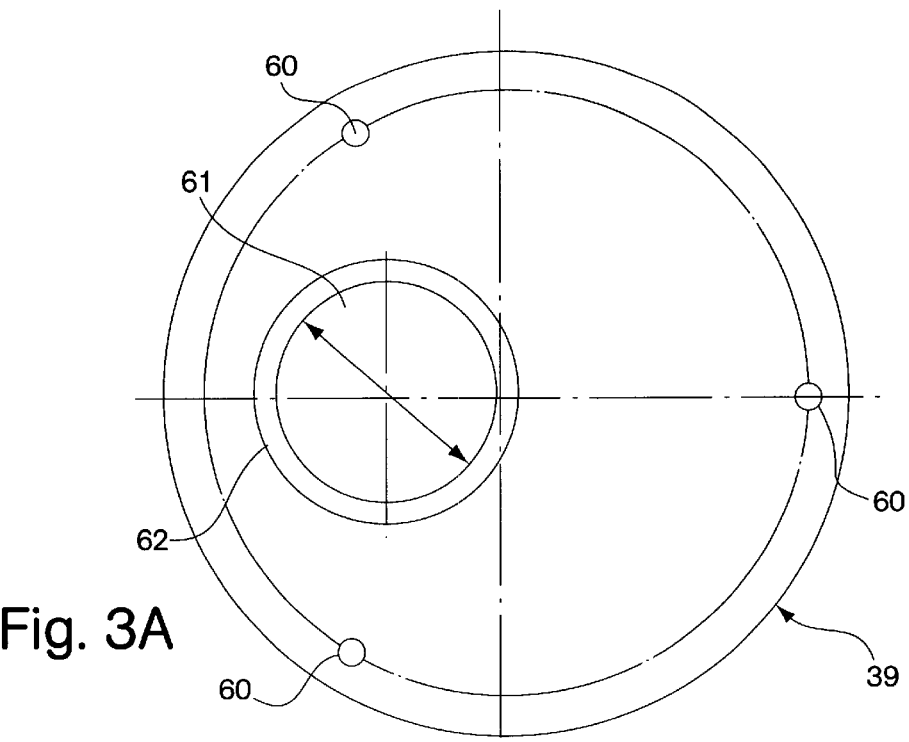
FIG. 3A is a front elevation of the derby cover adapted according to the present invention according to FIG. 3.
Figure 3B:
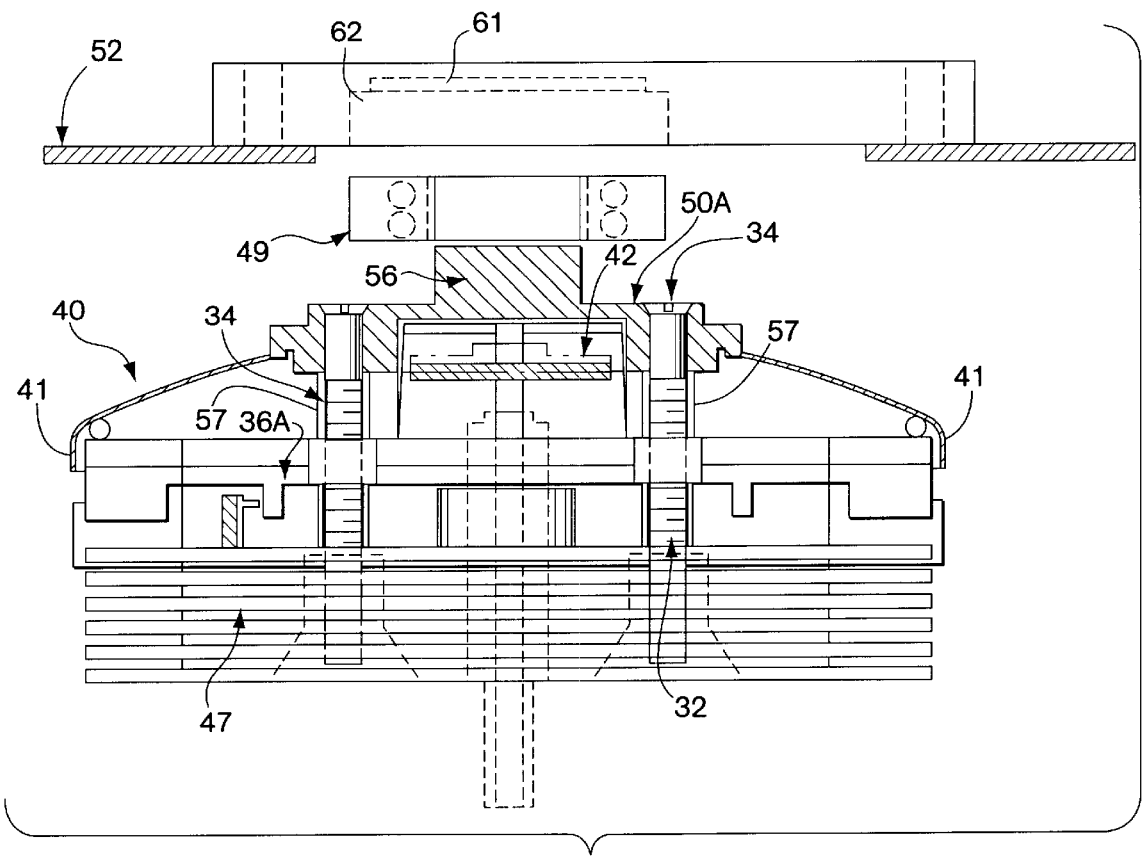
FIG. 3 is an elevation, partially cut-away view of an alternate embodiment according to the present invention.

In some multi-disk clutch assemblies, and especially a "wet" clutch shown in FIG. 3, a diaphragm spring 40 is employed to uniformly apply a force on the clutch pressure plate 36A. An adjustment plate 50A is used to change the tension of the diaphragm spring 40 to the pressure plate 36A. An adjustment capability molded into some stock adjustment plates can be separated from the mandrel by using an independent set of metal spacing washers, leaving a more traditional adjustment plate configuration. Some pressure plates use a large diameter adjustment bolt and lock nut 42. The housing of this bolt and lock nut 42 may cause some interference problems with the mandrel 50A. An embodiment according to the present invention can be provided by mounting the previously described type of mandrel 50 on-top of the original adjustment plate or provided for by thickening the base of the mandrel 50A so that a countersunk hole into the base eliminates any interference problems with this housing.

A front elevation view of the cover 39 adapted according to the present invention is shown in FIG. 3A, showing the conventional cover mounting holes 60 and the support bearing 49 recesses 61 and 62. According to another embodiment of the present invention, a deep groove bearing may also be used when carefully installed to insure proper axial alignment.

In clutch assemblies where the clutch pressure plate is independent of the diaphragm spring, there is a tendency for the clutch pressure plate and/or the diaphragm spring to move off-center from centrifugal force. According to the present invention, the diaphragm spring may be modified by appending a cylindrical guide to its circumscribed boundary. The diameter of the bosses, e.g. 32, on the inner clutch hub can also be adjusted by employing stamped collars 57, preferably of steel. Enlarging the diameter of the boss in this manner will create a tighter fit between the clutch pressure plate and the stabilizing restraint of the bosses on the inner clutch hub. The collars on the bosses in conjunction with the guiding rail 41 on the diaphragm spring 40 will provide the restraint necessary to achieve a continuously centered movement of the clutch pressure plate and diaphragm spring during clutch release.

Figure 4:
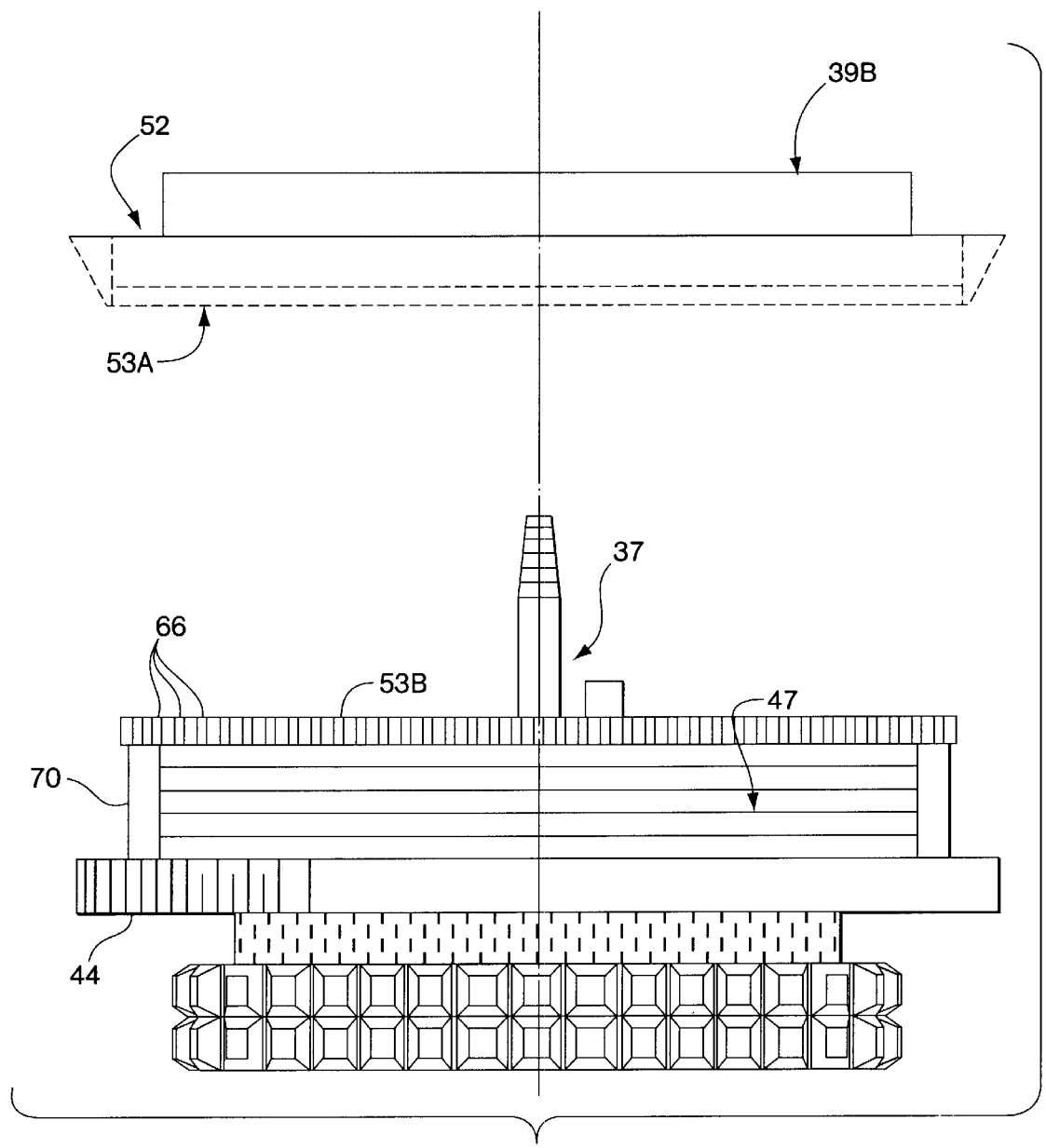
FIG. 4 is a partially exploded elevation view of a further alternate embodiment according to the present invention.

A further embodiment according to the present invention, as shown in FIG. 4, is to provide roller bearing support between the outer clutch hub 70 and the primary chain cover housing 52 with a bearing race. Since the outer clutch hub 70 may be larger in diameter or offset from the opening provided for the cover 39B, a bearing race 53A may be provided on the chain cover 52 itself. Alternately, if the outer clutch hub 70 (and lesser diameter roller bearing support) permits it, the bearing race may be provided on the cover 39B itself. Needle bearing rollers 66 are fitted between the race 53B on the outer clutch hub 70 and the larger diametered cover race 53A, and may alternately be provided by ball bearings retained between the races.

Figure 5:
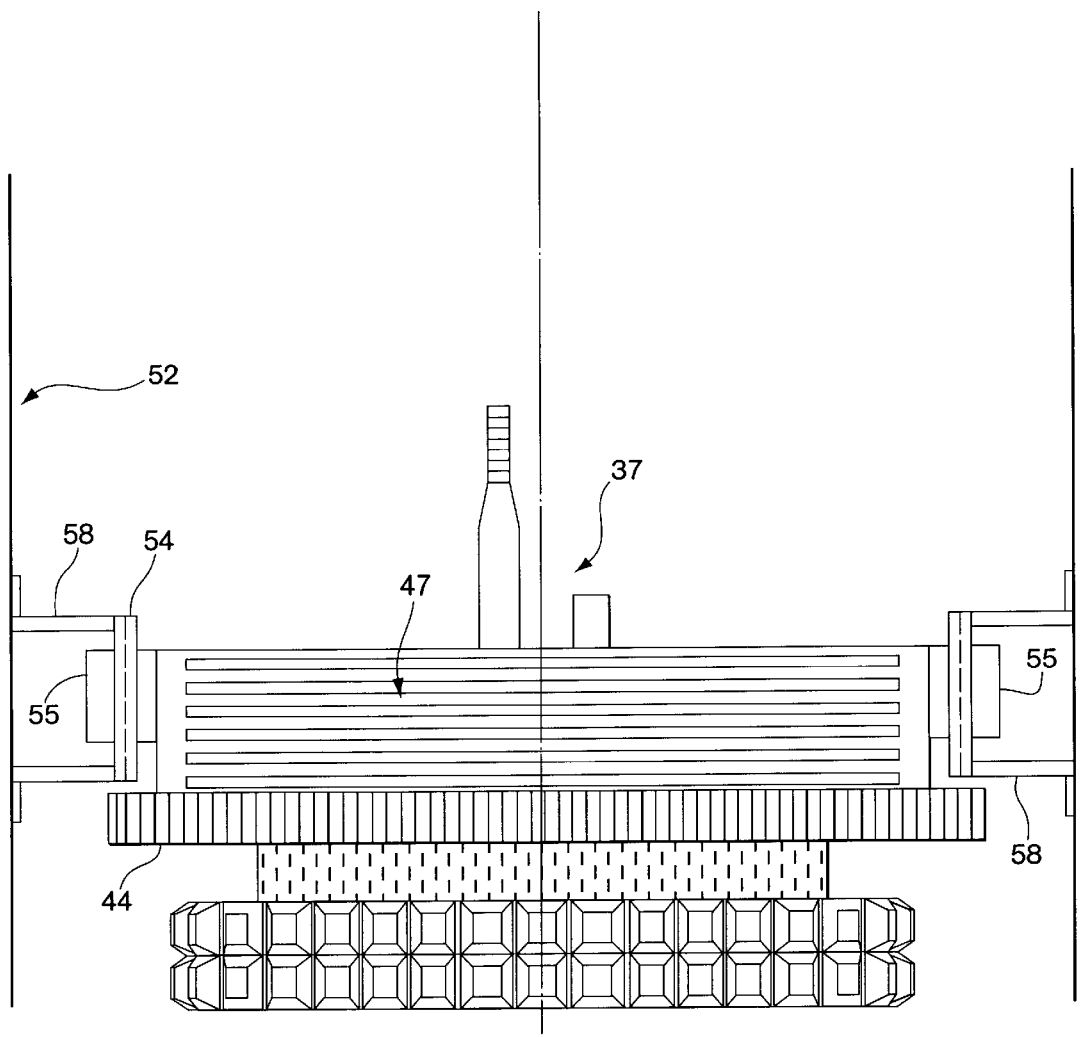
FIG. 5 is an elevation view of a further alternate embodiment according to the present invention.

A further alternate embodiment is shown in FIG. 5, wherein three or more Teflon(TM)-coated (or other type of) idler rollers 55 are mounted on sealed bearings 54, which are in turn mounted on support brackets 58. The idler rollers 55 are disposed on the cover 52 to contact the outer clutch hub 70 surface and urge the clutch assembly 30 into perpendicular alignment with respect to the extension of the centerline of the transmission input and output shafts.

The specificity of the exemplary embodiments provided herein is not to be read to limit any claimed means plus/and/or function, but merely provide reasonable and sufficient illustration thereof to one of ordinary skill in the art. Modifications and substitutions according to one of ordinary skill in the art are within the scope of the present invention, which is not to be limited, except by the claims which follow. While the preferred embodiments of the present invention relate to a kit (or kits) of material for upgrading existing equipment, the present invention also includes other, newly manufactured equipment having similarly disposed clutch assemblies, with the present inventive features therein.

What is claimed is:

1. A motorcycle clutch support for use with a motorcycle clutch having an output shaft on a first side of a clutch assembly having a housing thereover, comprising:
    a mandrel mounted to a clutch hub extending away from said output shaft;
    a derby cover retained by said clutch assembly housing; and
    a bearing assembly disposed to engage said mandrel and being mounted on said derby cover.

2. The motorcycle clutch support of claim 1, wherein said mandrel comprises a hardened steel mandrel.

3. The motorcycle clutch support of claim 1, wherein said bearing assembly includes a self-aligning bearing.

4. The motorcycle clutch support of claim 1, wherein said bearing assembly includes a pillow block bearing having a sleeve for alignment thereof.

5. The motorcycle clutch support of claim 1, wherein said bearing assembly includes a deep groove bearing.

6. The motorcycle clutch support of claim 1, wherein said bearing assembly is mounted on a derby cover, said derby cover being retained by said clutch assembly housing.

7. The motorcycle clutch support of claim 1, wherein said clutch assembly includes a diaphragm spring and a plurality of bosses, said motorcycle clutch support further comprises
    a cylindrical guide attached to said diaphragm spring; and
    a plurality of steel collars overlayed on said bosses.

8. A motorcycle clutch support for use with a motorcycle clutch having concentric input and output shafts on a first side of a clutch assembly having an outer circumference and a housing thereover, comprising:
    a bearing assembly adapted to engage the outer periphery of said motorcycle clutch; and
    means for retaining said bearing assembly to said housing.

9. The motorcycle clutch support of claim 8, wherein said clutch assembly includes a diaphragm spring and a plurality of bosses, said bearing assembly further comprises
    a cylindrical guide attached to said diaphragm spring; and
    a plurality of steel collars overlayed on said bosses.

10. The motorcycle clutch support of claim 8, wherein said clutch assembly includes
    a first bearing race having a diameter and being attached to the outer circumference of said clutch hub assembly,
    a second bearing race of a diameter larger than said first bearing race disposed on said housing, and
    a plurality of bearings disposed to engage and support said first bearing race by said second bearing race.

11. The motorcycle clutch. support of claim 10, wherein said plurality of bearings comprises one of a plurality of needle roller bearings and a plurality of ball bearings.

12. The motorcycle clutch support of claim 8, wherein said plurality of bearings comprises 3 or more idler rollers having sealed bearings disposed on support brackets.

13. The motorcycle clutch support of claim 12, wherein said idler rollers comprise Teflon(TM) coated idler rollers.

14. A motorcycle clutch enhancement kit, comprising
    a clutch mandrel to be disposed on a clutch hub, and having a shaft extending axially outward from said clutch hub;
    a derby cover; and
    a bearing mounted on said derby cover and disposed to receive said mandrel shaft and provide support to said mandrel shaft and to said clutch.

15. The motorcycle clutch enhancement kit of claim 14, wherein said derby cover includes a recess to receive said bearing therein.

16. The motorcycle clutch enhancement kit of claim 14, wherein said bearing includes bearing mounts to attach said bearing to said derby cover.

17. A motorcycle clutch enhancement kit, comprising an inner bearing race disposed on a clutch assembly and having an inner circumference;

an outer bearing race disposed on a clutch housing and having an outer circumference larger than said inner bearing circumference;

a plurality of one of needle roller bearings and of ball bearings disposed to engage said inner and said outer bearing races to provide support to said clutch assembly.

18. A motorcycle clutch enhancement kit for use with a clutch assembly in a clutch housing, comprising at least three idler rollers having sealed bearings mounted on support brackets disposed on said clutch housing to engage and support said clutch assembly.

* * * * *